United States Patent [19]

Kemmetmueller

[11] 4,183,463
[45] Jan. 15, 1980

[54] RAM ERROR CORRECTION USING TWO DIMENSIONAL PARITY CHECKING

[75] Inventor: Gary H. Kemmetmueller, Rogers, Minn.

[73] Assignee: Sperry Rand Corporation, New York, N.Y.

[21] Appl. No.: 929,768

[22] Filed: Jul. 31, 1978

[51] Int. Cl.² .................. G06F 11/10; G11C 29/00
[52] U.S. Cl. ........................ 235/312; 340/146.1 AG
[58] Field of Search ............ 340/146.1 AG; 235/312; 364/900

[56] References Cited

U.S. PATENT DOCUMENTS

| | | | |
|---|---|---|---|
| 3,242,461 | 3/1966 | Silberg et al. | 340/146.1 AG |
| 3,629,825 | 12/1971 | Bloom | 340/146.1 AG |
| 3,831,144 | 8/1974 | En | 340/146.1 AG |
| 3,887,901 | 6/1975 | Moore | 340/146.1 AG |
| 4,016,409 | 4/1977 | Kim | 235/312 |
| 4,035,766 | 7/1977 | Barker | 235/312 |

*Primary Examiner*—Charles E. Atkinson
*Attorney, Agent, or Firm*—John L. Rooney; Kenneth T. Grace; Marshall M. Truex

[57] ABSTRACT

An apparatus for and a method of providing error correction in a random access memory (RAM) using two dimensional parity checking. The RAM and a parity register are initialized such that the parity register represents the proper (i.e., either odd or even) longitudinal parity (i.e., parity for each individual bit position of all addressable locations) for the RAM. The parity register is updated each time an addressable location of the RAM is written into to maintain proper longitudinal parity. The horizontal or word parity of each addressable location is checked each time that addressable location is read. At the observance of improper word parity, a memory controller halts normal activity and recomputes the longitudinal parity by reading each addressable location of the RAM. A logical comparison (exclusive-or) of the current longitudinal parity at the time of observance of improper word parity with the recomputed longitudinal parity reveals the failing bit position. The memory controller corrects the failing bit position in the contents of the addressable location observed to have improper word parity and normal operation is resumed.

5 Claims, 6 Drawing Figures

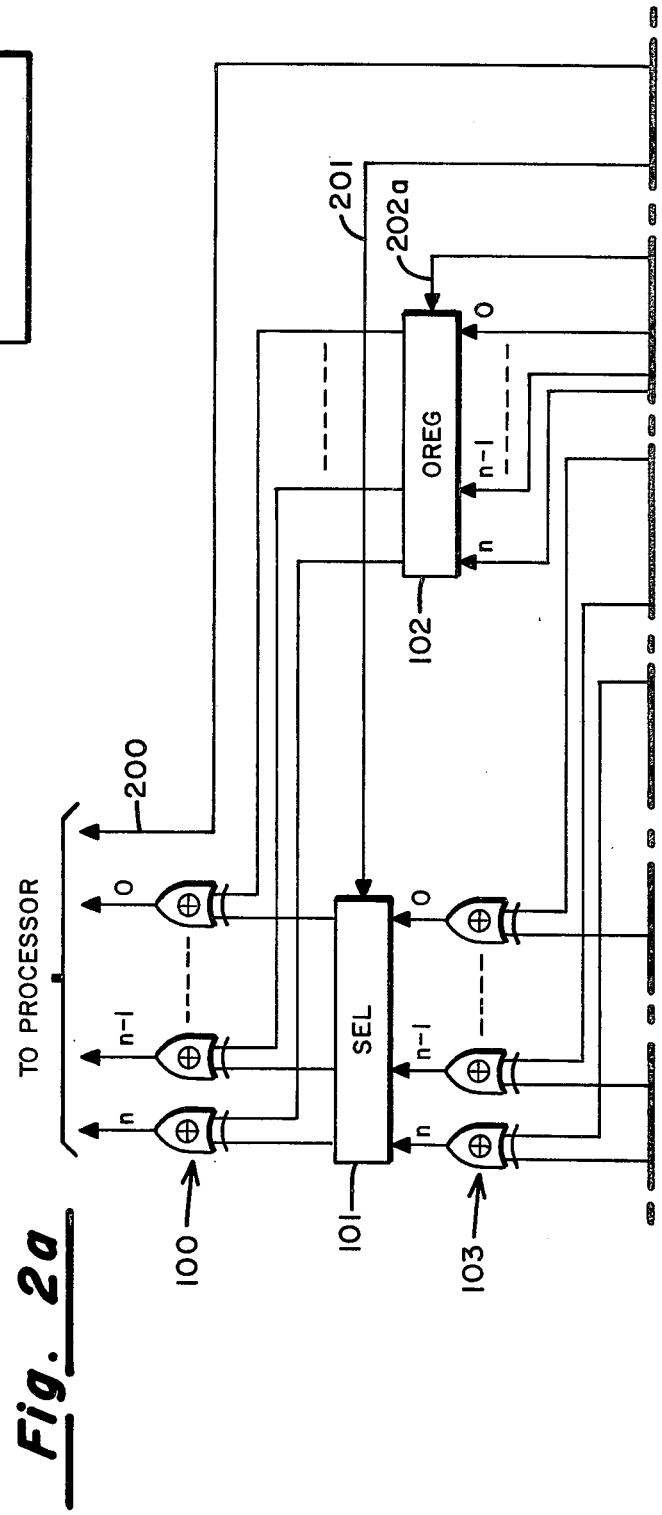

RAM ERROR CORRECTION USING TWO DIMENSIONAL PARITY CHECKING

BACKGROUND OF THE INVENTION

The present invention relates generally to digital data processing equipment and more specifically to an improved method of correcting memory errors.

A rather well known method for detecting the occurrence of errors in digital data processing and digital transmission systems involves the use of the so-called "parity checking" technique. In general, an addition bit position is assigned to each word of data and that bit is set to a binary "1" or "0" such that the total number of 1-bits in the composite word will be odd or even, depending upon the convention used. Assuming that an odd parity convention is employed, when the word is transmitted from a source to a destination, a check is made to determine whether the number of 1-bits is still odd. If the check reveals that the transmitted word includes an even number of 1-bits, it is known that an error has occurred in the transmission.

For a fuller understanding of parity checking and its application to a magnetic tape storage system, reference is made to the Lisowski U.S. Pat. No. 3,183,483. As is set forth in the Lisowski patent, a higher degree of error checking can be accomplished by not only applying parity checking techniques to individual words, but also by applying the technique to a series of words stored serially on a magnetic tape. This last mentioned technique is the so-called "longitudinal" parity checking. By using both horizontal and longitudinal parity checking, a higher degree of error detection can be accomplished.

While longitudinal parity checking has found application in magnetic tape and punched paper tape devices which are commonly considered peripheral equipment in an electronic data processing system, only horizontal parity checking has found application with the information stored in the main random access memories (RAM's) commonly utilized in computer mainframes.

The present invention utilizes the arrangements for generating longitudinal parity for the data stored in a computer mainframe memory (i.e., RAM) disclosed by Harry Winthrop Moore, III, in U.S. Pat. No. 3,387,901 assigned to the assignee of the present invention. Whereas Moore III teaches the generation of longitudinal parity for computer mainframe memories, the present invention combines that technique with the horizontal parity common in the art in a novel fashion to provide an apparatus for and a method of correcting errors from a random access memory.

SUMMARY OF THE INVENTION

The present invention computes longitudinal parity for the RAM using the technique as taught by Harry Winthrop Moore, III in U.S. Pat. No. 3,887,901. Moore, III, initializes the RAM and a parity register before use of the RAM such that proper longitudinal parity is established. When odd parity is used, for example, all data bits of the RAM are cleared to zero, the horizontal parity bits are set to one, the bit positions of the parity register corresponding to data bits of the RAM are set to one, and the bit positions of the parity register corresponding to the horizontal parity bits of the RAM are set to one for an even number of addressable locations of the RAM (cleared to zero for an odd number of addressable locations of the RAM). After initialization for each write into an addressable location of the RAM, Moore, III, teaches that an exclusive-or (XOR) of the old contents of the addressable location with the contents of the parity register and an XOR of the new contents of the addressable location with the content of the parity register causes the RAM and the parity register to maintain correct longitudinal parity.

The present invention combines the technique of Moore, III, with the horizontal parity commonly used with RAM's, in a novel manner to provide error correction. Upon each read from the RAM in response to a requestor (e.g., processor), word parity is checked. For proper odd parity, for example, this means that an odd number of ones is present considering all bit positions of the contents of any addressable location as read from the RAM. If proper horizontal parity is found, operation continues as normal. If, however, improper parity is found, the content of the addressable location read is assumed to contain an error and is held until correction is accomplished. To find the failing bit position, the present invention recomputes the longitudinal parity by initializing (i.e., clearing) a second parity register. Each addressable location of the RAM is read and the contents thereof are XOR'ed with the contents of the second parity register. When all addressable locations have been read and the contents thereof XOR'ed with the contents of the second parity register, a logical comparison is made of the second parity register with the first parity register (i.e., contents are XOR'ed). The resultant identifies the failing bit position which is XOR'ed with the content of the addressable location found to have improper work parity, thereby correcting the content of that addressable location. The corrected content of the addressable location is transferred to the requestor (e.g., processor) and normal operation is resumed.

DETAILED DESCRIPTION OF THE PREFERRED EMBODIMENT

Figure 1:
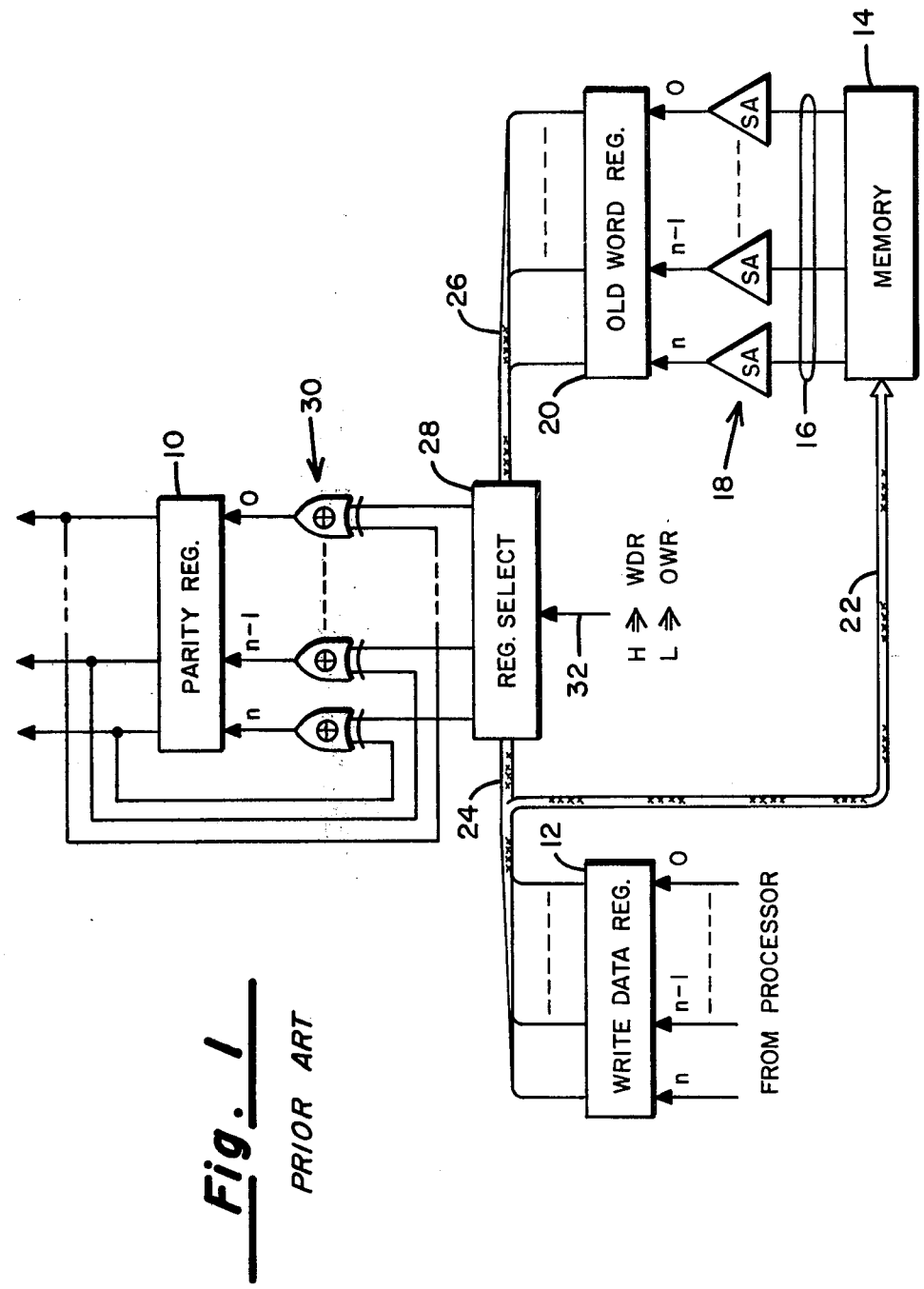
FIG. 1 shows the prior art longitudinal parity generator of Harry Winthrop Moore, III, as disclosed in U.S. Pat. No. 3,887,901.

In its preferred embodiment, the present invention employs longitudinal parity generation as taught by Harry Winthrop Moore, III, in U.S. Pat. No. 3,887,901. It is recommended that the Moore, III, patent be read as it is incorporated herein by reference. FIG. 1, labeled as prior art, shows the preferred embodiment of Moore, III. In his operational example, Moore, III, assumes the use of odd parity and assumes a Memory 14 of four addressable locations each having the capacity to store six binary bits. The initial conditions postulated by Moore, III, are given in Table A. The use of horizontal or work parity as required with the present invention necessitates the addition of one binary bit to each addressable location of Memory 14 and to the parity register. Table B shows the initial conditions of Memory 14 and the parity register showing the appended parity bit (odd parity is assumed for horizontal parity as well as longitudinal parity).

Figure 2B:
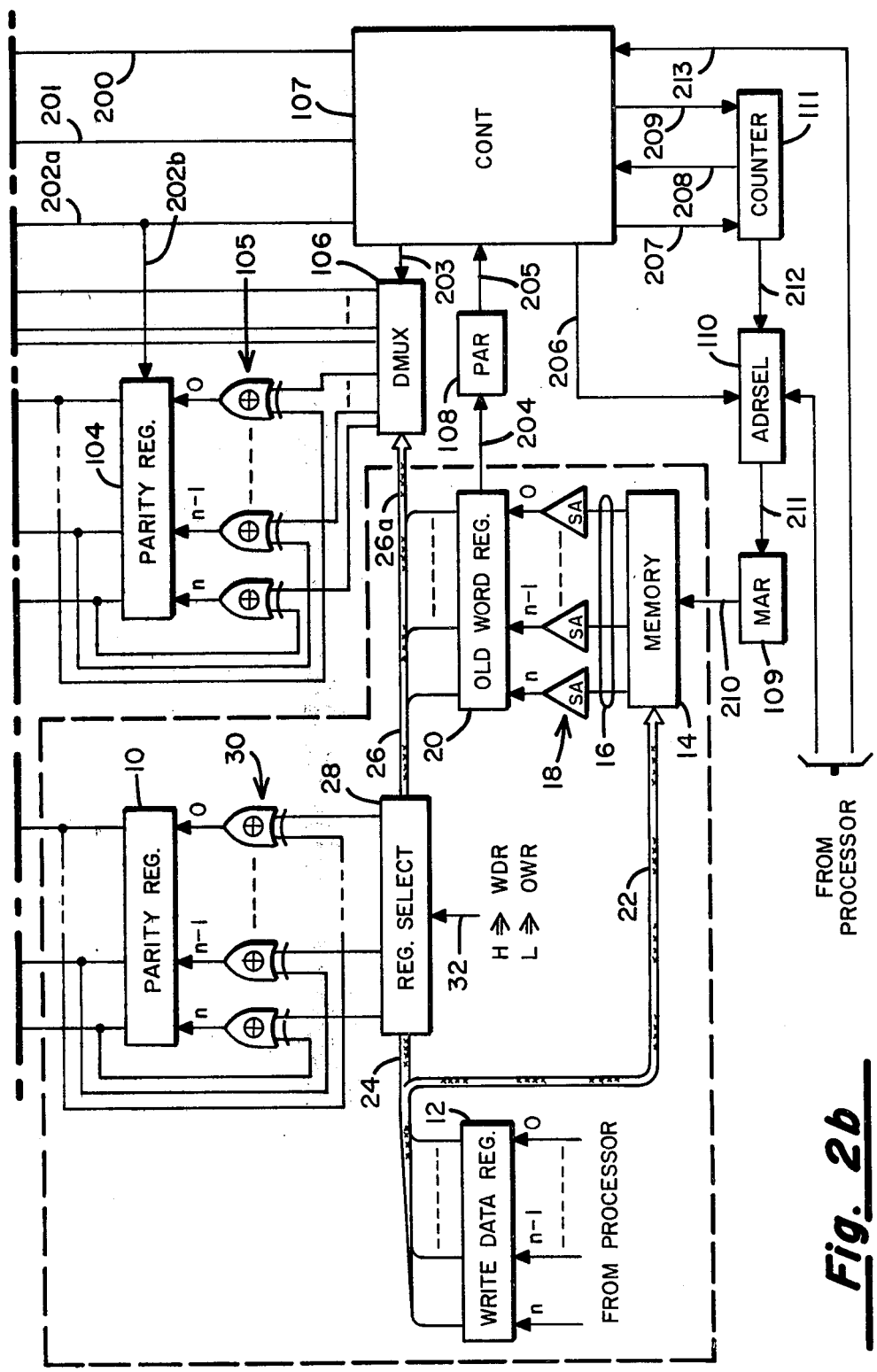
FIG. 2, comprised of FIGS. 2a and 2b, shows the present invention incorporating the prior art longitudinal parity generator of Moore, III.

As shown in FIG. 2, the present invention utilizes the longitudinal parity generator of Moore, III, (within dashed lines) in cooperation with a horizontal parity checker, PAR 108, a second Parity Register 104, additional exclusive-or (XOR) circuits 100, 103 and 105, and control logic to effect the desired error correction. The Moore, III, apparatus recomputes longitudinal parity at the occurrence of each write operation. This value of longitudinal parity will be referred to as write running sum which is produced by the circuits XOR 30, and stored in PARITY REG 10. At the detection by PAR 108 of improper horizontal parity, longitudinal parity is recomputed via the circuits XOR 105, and stored in PARITY REG 104 as the read running sum. The write running sum and read running sum are logically compared by the circuits, XOR 103. The resultant corrects the content of the addressable location found to have improper word parity via the circuits, XOR 100.

TABLE A

| ADDRESS | DATA |
|---|---|
| α | 0 0 0 0 0 0 |
| α + 1 | 0 0 0 0 0 0 |
| α + 2 | 0 0 0 0 0 0 |
| α + 3 | 0 0 0 0 0 0 |
| Parity Register | 1 1 1 1 1 1 |

TABLE B

| ADDRESS | PARITY BIT | DATA |
|---|---|---|
| α | 1 | 0 0 0 0 0 0 |
| α + 1 | 1 | 0 0 0 0 0 0 |
| α + 2 | 1 | 0 0 0 0 0 0 |
| α + 3 | 1 | 0 0 0 0 0 0 |
| Parity Register | 1 | 1 1 1 1 1 1 |

Memory 14 is addressed by the content of Memory Address Register, MAR 109 via line 210. For Memory 14 containing four addressable locations, an address of two binary bits is required. Therefore, MAR 109 has the capacity for supplying an address of two binary bits to Memory 14 via line 210. Those skilled in the art know that the capacity of Memory 14 is rather arbitrary and other capacities may be used with the present invention necessitating well known changes to the capacity of MAR 109. The address selector, ADRSEL 110 supplies an address to MAR 109 of two binary bits via line 211. ARDSEL 110 supplies either the two bit address received from the processor or the two bit address received from COUNTER 111 via line 212 based upon the state of line 206 as set by the Controller, CONT 107. In this manner CONT 107 may cause ADRSEL 110 to select the two bit address supplied from the processor or the two bit address supplied by COUNTER 111 via line 212. COUNTER 111 is a counter having two binary bit positions. CONT 107, via line 207, can cause both bit positions of COUNTER 111 to be cleared to zero by setting line 207 high. COUNTER 111 is incremented (i.e., a binary one is added to its contents) each time a state of high is received from CONT 107 via line 209. COUNTER 111 sets line 208 high when both of its bit positions are set to binary ones. Table C provides the normal sequence of events in the operation of COUNTER 111. The two bit contents of COUNTER 111 are supplied to ADRSEL 110 via line 212.

TABLE C

| EVENT | LINE 207 | LINE 208 | LINE 209 | CONTENTS OF COUNTER 111 |
|---|---|---|---|---|
| 1 | High | Low | Low | 0 0 |
| 2 | Low | Low | High | 0 1 |
| 3 | Low | Low | High | 1 0 |
| 4 | Low | High | High | 1 1 |

PAR 108 checks for proper horizontal parity on the content of each addressable location as read from Memory 14. To accomplish this, the seven-bit content of OLD WORD REG 20 is transferred to PAR 108 via line 204. Improper parity (i.e., even number of binary bit positions set to binary ones for odd parity mode) causes PAR 108 to set line 205 to a state of high to notify CONT 107 of an improper parity condition. PAR 108 maintains line 205 low at all other times. It is assumed that PAR 108 will be a monolithic device commonly available.

In addition to the content of OLD WORD REG 20 (as received from Memory 14) being transferred to REG SELECT 28 via cable 26 as in Moore, III, the content of OLD WORD REG 20 is also transferred to demultiplexer, DMUX 106 via cable 26A. The function of DMUX 106 is to switch the content of OLD WORD REG 20 as received via cable 26A to either the output register, OREG 102, or to the circuits, XOR 105 based upon the state of line 203 as determined by CONT 107. If the state of line 203 is low, DMUX 106 switches the quantity received via cable 26A to OREG 102. If the state of line 203 is high, DMUX 106 switches the quantity received via cable 26A to the circuits, XOR 105. Again, DMUX 106 provides a function commonly found in monolithic form and need not be explained further. OREG 102 is a register commonly composed of bi-state devices (e.g., flip-flops) wherein one such bi-state device is allocated to each bit position of the data received from DMUX 106. All bi-state devices of OREG 102 are cleared (i.e., cleared to binary zeros) when line 202 (and hence 202A) is at a state of high. In this manner CONT 107 can clear OREG 102 before the content of an addressable location of Memory 14 is switched to OREG 102 by DMUX 106.

Careful examination of PARITY REG 104 and the circuits, XOR 105, reveal near identicality of structure and function with PARITY REG 10 and the circuits, XOR 30, of Moore, III. Whereas, PARITY REG 10 and the circuits, XOR 30, compute write running sum from the data received from REG SELECT 28, PARITY REG 104 and the circuits, XOR 105, compute read running sum from the data received from DMUX 106. All bi-state devices of PARITY REG 104 are cleared when line 202 (and hence 202B) is at a state of high. In this manner CONT 107 can clear PARITY REG 104 prior to computation of read running sum. The circuits, XOR 103, produce a logical comparison (i.e., exclusive-or) of each bit position of write running sum received from PARITY REG 10 with the corresponding bit position of read running sum received from PARITY REG 104. Those skilled in the art will readily recognize the result of the logical comparison is a binary zero for each bit position wherein the corresponding bit positions of write running sum and read running sum are identical (i.e., both are binary ones or both are binary zeroes) and a binary one for each bit position wherein the corresponding bit positions of write running sum and read running sum are not identical (i.e., one is a binary one and the other is a binary zero).

The result of the logical comparison made by the circuits, XOR 103, is transferred to selector, SEL 101. SEL 101 is a common device which switches the result of the logical comparison received from the circuits, XOR 103, to the circuits, XOR 100, if line 201 is at a state of high. If line 201 is at a state of low, SEL 101 transfers a zero to the circuits, XOR 100, at each bit position. The circuits, XOR 100, receive the contents of OREG 102 and the output of SEL 101. The circuits, XOR 100, complement (i.e., reverse the state of) any bit position of the content of OREG 102 for which the corresponding bit position received from SEL 101 contains a binary one. Therefore, if CONT 107 sets line 201 to a state of low, the circuits, XOR 100, receive all zeros from SEL 101 and the circuits, XOR 100, transfer the contents of OREG 102 to the processor as received. If, however, CONT 107 sets line 201 to a state of high, the circuits, XOR 100, receive a binary one for each bit position for which the corresponding bit position of write running sum and read running sum are not identical, thereby complementing (i.e., correcting) the corresponding bit position of the contents of OREG 102 while transferring the contents of OREG 102 to the processor. Line 200 permits CONT 107 to notify the processor when the requested data is ready for transfer. Line 200 at a state of high signifies data ready whereas line 200 at a state of low signifies the data is not ready.

Figure 3:
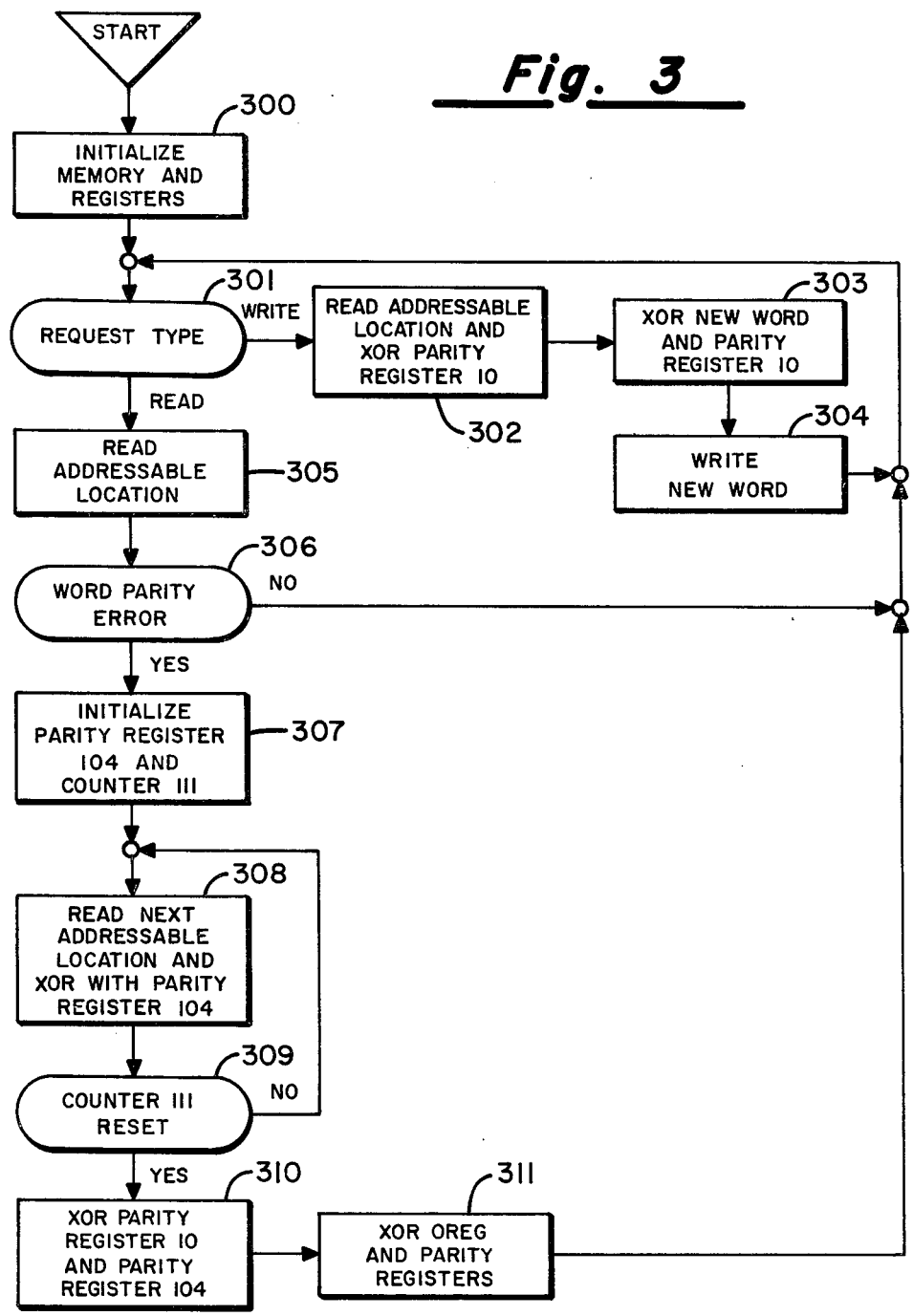
FIG. 3 is a flowchart of the operation of the present invention.

FIG. 3 shows the operation of the present invention in flowchart format. Following initialization at step 300, the memory receives a request from the processor. If the request is a write request, the addressable location is read and the old contents XOR-ed with Parity Register 10 as illustrated by step 302. At step 303, the new work is XOR-ed with Parity Register 10. Steps 302 and 303 update the write running sum to correspond to the write operation. The new word is written into the addressable location at step 304, and the next request is awaited at step 301.

Should the next request be a read request, the addressable location is read at step 305. The content of the addressable location is checked for proper word parity at step 306. Should no horizontal parity error exist, the operation returns to step 301 to await the next request.

Should a word parity error be found at step 306, Parity Register 104 and Counter 111 are initialized (i.e., cleared to all zeroes). Each next addressable location is read at step 308 and the contents are XOR-ed with Parity Register 104. Counter 111 ensures that all addressable locations of Memory 14 have been read at step 309. If not, Counter 111 is incremented and step 308 is repeated with the next addressable location.

After all addressable locations have been read at step 308, Parity Register 104 contains the read running sum. At step 310, the write running sum (i.e., contents of Parity Register 10) and the read running sum (i.e., contents of Parity Register 104) are XOR-ed. Step 311 XOR's the result of step 310 with the content of the addressable location having improper parity (i.e., content of Output Register, OREG 102). The corrected data is sent to the processor (not shown) and normal operation resumes at step 301.

The write operation is as explained by Moore III.

During a normal read operation (i.e., no horizontal parity errors are found), CONT 107 holds line 206 at a state of high. See FIG. 2. This causes ADRSEL 110 to select the two bit address received from the processor for each requested reference of Memory 14. ADRSEL 110 transfers the two bit addresses to MAR 109 via line 211. Memory 14 accesses the addressable location corresponding to the two bit address received from MAR 109 via line 210. The seven bit content of the addressable location is transferred from Memory 14 to OLD WORD REG 20 via cable 16 and sense amplifiers, SA 18. The seven bit content of the addressable location is transferred to PAR 108 via line 204 and to DMUX 106 via cable 26A. Since PAR 108 finds proper horizontal parity (i.e., an odd number of binary ones for the odd parity mode), PAR 108 informs CONT 107 of proper horizontal parity by maintaining line 203 and line 201 at a state of low. CONT 107 sets line 202 (and hence 202A) to a state of high to clear OREG 102 and returns line 202 (and hence 202A) to its normal state of low to permit OREG 102 to receive the content of the addressable location as read from Memory 14. DMUX 106 switches the data received via cable 26A to OREG 102 because CONT 107 has maintained line 203 at a state of low. OREG 102 forwards the data received to the circuits, XOR 100, for transmission to the processor, SEL 101 transfers all zeroes (i.e., a binary zero at each bit position) to the circuits, XOR 100, because CONT 107 has maintained line 201 at a low. Therefore, the circutis, XOR 100, transfer to the processor the data as received from OREG 102 without attempting any error correction. CONT 107 sets line 200 to a state of high to notify the processor that the requested data (i.e., content of the addressable location of Memory 14) is available.

Figure 4:
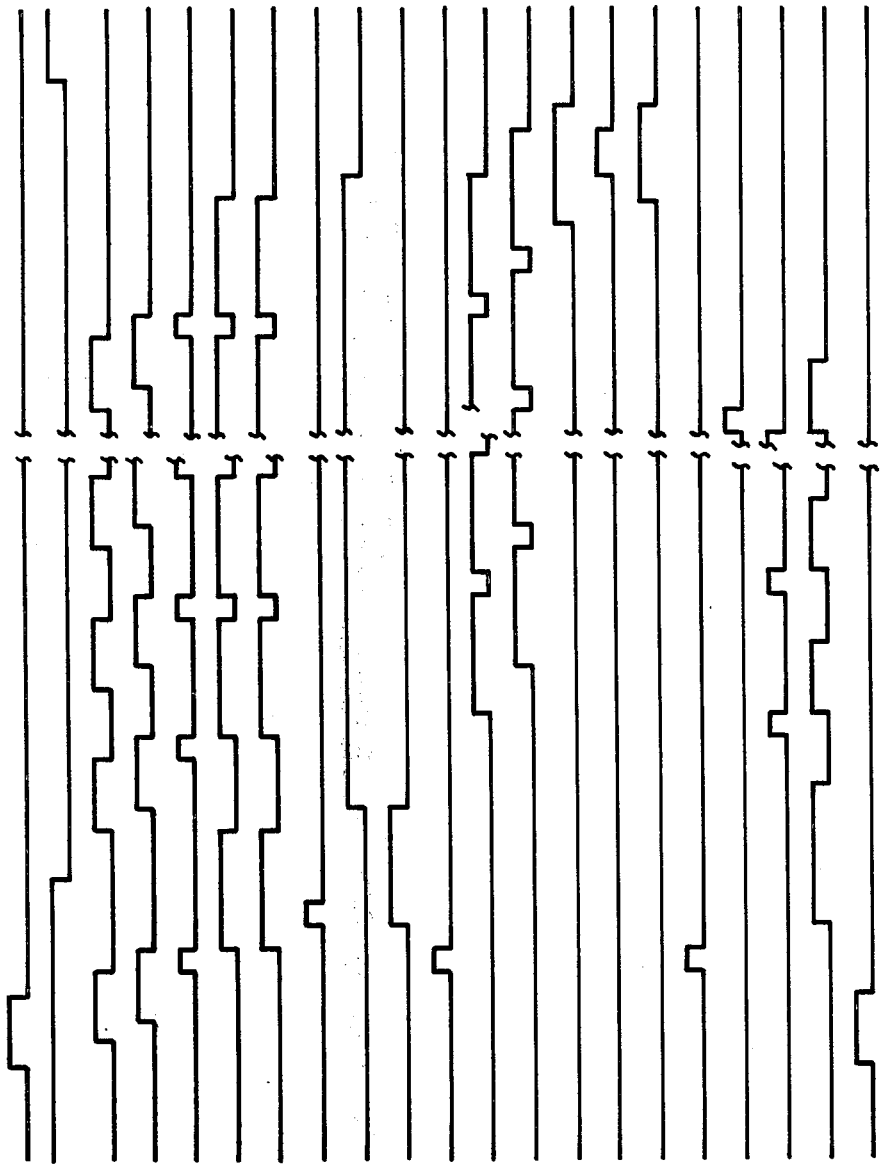
FIG. 4 shows the relative timing of the operation of the apparatus of FIG. 2.

FIG. 4 shows the relative timing of the sequence in which an addressable location of Memory 14 is read, improper horizontal parity is found, the read running sum is computed, the content of the addressable location having improper horizontal parity is corrected, and the corrected data is transferred to the processor. Note that reference to FIG. 2 in conjunction with the timing discussion may prove helpful. An address (ADR) is received from the processor. CONT 107 is notified via a state of high on line 213 that the address corresponds to a read request. Because normal operation is assumed (i.e., no error correction is in process), line 206 is at a state of high thereby commanding ADRSEl 110 to select the address received from the processor for transfer to MAR 109 via line 211. Line 211 transfers the address received from the processor to MAR 109. The address is transferred from MAR 109 to Memory 14 via line 210. Memory 14 is read at the addressable location specified by the address received via line 210, and the contents are transferred via cable 16 to OLD WORD REG 20. CONT 107 clears OREG 102 via a state of high on line 202 to prepare OREG 102 to receive the data. Notice that PARITY REG 104 is also cleared. COUNTER 111 is simultaneously cleared by a state of high received from CONT 107 via line 207. The data from OLD WORD REG 20 is transferred to DMUX 106 via cable 26A and to PAR 108 via line 204. Because line 203 is at a state of low, DMUX 106 tranfers the data to OREG 102.

PAR 108 detects improper parity on the data received via line 204. In response PAR 108 sends a state of high to CONT 107 via line 205. CONT 107 sets line 206 to a state of low to cause ARDSEL 110 to select addresses received from COUNTER 111 via line 212 for transfer to MAR 109 via line 211. COUNTER 111 contains a binary zero (i.e., both bit positions of COUNTER 111 are zero). Therefore, ADRSEL 110 receives an address of zero from COUNTER 111 via line 212 and transfers the address of zero to MAR 109 via line 211. MAR 109 transfers the address of zero to Memory 14 via line 210. Memory 14 is read at the addressable location corresponding to address zero and the content is transferred to OLD WORK REG 20 via cable 16. Cable 26A transfers the content of addressable location zero to DMUX 106 from OLD WORD REG 20 via cable 26A. Because CONT 107 has caused line 203 to be at a state of high, DMUX 106 switches the content of addressable location zero received via cable 26A to the circuits, XOR 105. This transfer becomes the first entry to read running sum which is maintained by PARITY REG 104. Notice that write running sum from PARITY REG 10 and the partial read running sum from PARITY REG 104 are transferred via the circuits, XOR 103, to SEL 101. Since line 201 is at a state of low, however, SEL 101 tranfers only binary zeroes (i.e., zero at each bit position) to the circuits, XOR 100.

Meanwhile CONT 107 transfers a positive to COUNTER 111 via line 209. This causes COUNTER 111 to be incremented to a binary value of one. See also Table C. Addressable location one is similarly read and its content utilized to produce a new partial read running sum. This process is repeated until COUNTER 111 receives a state of high via line 209 which causes COUNTER 111 to be incremented to contain its maximum value of all ones (i.e., both bit positions are one). Upon sensing this, COUNTER 111 transfers a state of high to CONT 107 via line 208 to signify that the last addressable location of Memory 14 is being read and that the next value of read running sum to be transferred to the circuits, XOR 103, is the final read running sum.

The final addressable location (i.e., address 3) of Memory 14 is read as the previous addressable locations and the content transferred to the circuits, XOR 105, via cable 16, Cable 26A, and DMUX 106. The circuits, XOR 103. receive the final read running sum from PARITY REG 104 and exclusive-or it with the write running sum received from PARITY REG 10. As shown, the resultant arrives at SEL 101. CONT 107 sets line 201 to a state of high enabling the resultant to the circuits, XOR 100, which also receive the content of the addressable location with improper horizontal parity from OREG 102. The circuits, XOR 100, correct the error in the data received from OREG 102 and transfers the corrected data to the processor. CONT 107 sets line 200 to a state of high to notify the processor that the corrected data is now available.

The preferred embodiment is illustrated using a Memory 14 employing odd parity and containing four addressable locations each having the capacity for six data bits and one parity bit. Those of ordinary skill in the art will be able to readily adapt the present invention to other memory configurations.

What is claimed is:

1. In a computer with a random access memory having first longitudinal parity generation and horizontal parity checking, the improved method of correcting errors in data read from said random access memory comprising:

computing second longitudinal parity in response to notification of a horizontal parity error in data read from said random access memory; and complementing each bit position in data read from said random access memory containing said horizontal parity error for which the corresponding bit position of said first longitudinal parity generation and said second longitudinal parity computation yield unequal values.

2. The improved method of correcting errors according to claim 1 wherein the complementing step further comprises:

first exclusive-oring the result of said first longitudinal parity generation with the result of said second longitudinal parity computation; and second exclusive-oring the result of said first exclusive-oring with data read from said random access memory containing said horizontal parity error.

3. In a computer having a random access memory, having a first longitudinal parity generation circuit, and having a horizontal parity checking circuit, the improved apparatus for correcting errors in data read from said random access memory comprising:

second longitudinal parity generation circuit coupled to said random access memory;

means responsively coupled to said horizontal parity checking circuit and said second longitudinal parity generation circuit for causing said second longitudinal parity generation circuit to recompute longitudinal parity at the occurrence of improper horizontal parity;

means responsively coupled to said first parity generation circuit and said second parity circuit for logically comparing the output of said first longitudinal parity generation circuit to the output of said second longitudinal parity generation circuit; and means responsively coupled to said random access memory, said causing means, and said logically comparing means for complementing each bit position of data read from said random access memory containing improper horizontal parity for which said logically comparing means found a difference in the corresponding bit position between said first longitudinal parity generation circuit and said second longitudinal parity generation circuit.

4. In a computer according to claim 3, the improvement wherein the logically comparing means further comprises:

first exclusive-or circuit to exclusive-or each bit position of said output of said first longitudinal generation circuit with the corresponding bit position of said output of said second longitudinal generation circuit.

5. In a computer according to claim 4, the improvement wherein the complementing means further comprises:

second exclusive-or circuit to exclusive-or each bit position of the output of said first exclusive-or circuit with the corresponding bit position of data read from said random access memory containing improper horizontal parity.

* * * * *